US005970581A

United States Patent [19]

Chadwick et al.

[11] Patent Number: 5,970,581

[45] Date of Patent: Oct. 26, 1999

[54] CONTROLLABLE FLUID GRIPPING DEVICES

[75] Inventors: Barry W. Chadwick; Michael T. Nowak, both of Simpsonville, S.C.

[73] Assignee: BIC Corporation, Milford, Conn.

[21] Appl. No.: 09/100,936

[22] Filed: Jun. 22, 1998

[51] Int. Cl.[6] B43K 23/00; B29C 33/40; B29C 71/02

[52] U.S. Cl. 16/421; 16/430; 16/110.1; 16/DIG. 12; 16/DIG. 19; 15/143.1; 15/443; 401/6

[58] Field of Search 16/110.1, 421, 16/422, 430, 436, DIG. 12, DIG. 19; 15/143.1, 443; 81/489; 401/6

[56] References Cited

U.S. PATENT DOCUMENTS

| | | | |
|---|---|---|---|
| H1050 | 5/1992 | Petrillo | 401/6 |
| 412,479 | 10/1889 | Davis | 16/430 |
| 588,794 | 8/1897 | Granger | 16/421 |
| 2,205,769 | 6/1940 | Sweetland | 145/61 |
| 3,269,399 | 8/1966 | Smith | 135/51 |
| 4,167,347 | 9/1979 | Hoyle | 401/88 |
| 4,338,270 | 7/1982 | Uffindell | 264/46.4 |
| 4,601,598 | 7/1986 | Schwartz et al. | 401/6 |
| 4,617,697 | 10/1986 | David | 16/DIG. 12 |
| 4,719,063 | 1/1988 | White | 264/45.2 |
| 4,785,495 | 11/1988 | Dellis | 16/111 R |
| 4,825,552 | 5/1989 | Bendickson et al. | 30/342 |
| 4,932,800 | 6/1990 | Lin et al. | 401/6 |
| 4,934,024 | 6/1990 | Sexton, I | 16/111 R |
| 4,941,232 | 7/1990 | Decker et al. | 16/111 R |
| 5,000,599 | 3/1991 | McCall et al. | 401/6 |
| 5,012,740 | 5/1991 | Hardt | 102/216 |
| 5,019,119 | 5/1991 | Hare, Sr. | 123/500 |
| 5,027,511 | 7/1991 | Miller | 30/85 |
| 5,056,945 | 10/1991 | Klodt | 401/6 |
| 5,123,348 | 6/1992 | Henson | 101/245 |
| 5,143,463 | 9/1992 | Pozil et al. | 401/6 |
| 5,155,878 | 10/1992 | Dellis | 16/111 R |
| 5,195,267 | 3/1993 | Daniels | 43/18.1 |
| 5,248,113 | 9/1993 | Daniels | 242/246 |
| 5,460,585 | 10/1995 | Gentry et al. | 482/1 |
| 5,475,894 | 12/1995 | Wildförster | 16/111 R |
| 5,492,312 | 2/1996 | Carlson | 267/140.14 |
| 5,548,848 | 8/1996 | Huybrechts | 2/425 |
| 5,556,083 | 9/1996 | Furihata et al. | 267/277 |
| 5,582,385 | 12/1996 | Boyle et al. | 248/550 |
| 5,607,996 | 3/1997 | Nichols et al. | 524/439 |
| 5,626,527 | 5/1997 | Eberlein | 473/203 |
| 5,692,265 | 12/1997 | Dalury | 16/111 R |

*Primary Examiner*—Chuck Y. Mah
*Assistant Examiner*—Donald M. Gurley
*Attorney, Agent, or Firm*—Pennie & Edmonds LLP

[57] ABSTRACT

The present invention relates to a gripping device for a hand held article. The gripping device has an encasement assembly for fitting on a hand grip portion of the article. The encasement assembly contains a controllable fluid, such as magnetorheological and electrorheological fluids. The gripping device also has an activating assembly for selectively applying a field to the controllable fluid to change its Theological behavior, e.g., increasing its viscosity. Thus, the controllable fluid can maintain the shape of the encasement assembly until the activating assembly withdraws the applied field therefrom. The present invention further relates to a manual implement that has the above gripping device fitted thereon and a method for using a manual implement having the above gripping device.

22 Claims, 5 Drawing Sheets

1 24 22 14 10 26 40 16 18 43 12 45 19 42 20

CONTROLLABLE FLUID GRIPPING DEVICES

FIELD OF THE INVENTION

The present invention relates to a gripping device adapted to fit on a hand held article and capable of providing a customized grip for the article for an individual user. In particular, the present invention relates to a gripping device, which encases a controllable fluid capable of imprinting a user's grip upon the application of a magnetic or electrical field and maintaining such a grip. The present invention further relates to a method for using such a gripping device.

BACKGROUND OF THE INVENTION

When using a hand held article, such as a pen, shaver, lighter, tool, and sporting equipments such as tennis, racquetball or tabletennis rackets, it is important that the user properly and comfortably holds the article. In doing so, the user can have better control of the article without incurring unnecessary fatigue to the user's hand. It has been found that the user's comfort increases as the hand position approaches its ergonomic or anatomic position.

Various attempts have been made to conform hand grips to an individual user's hand. One general approach is to provide a pre-contoured hand grip that conforms to an average user's hand. It is readily evident that such contoured hand grips are inadequate in conforming to individual users.

U.S. pat. Nos. 5,548,848 to Iuybrechts, 5,155,878 to Dellis, 4,934,024 to Sexton and 4,785,495 to Dellis disclose a hand grip that can be custom-molded to fit exactly the contours of a user's hand. These hand grips contain moldable materials such as thermoplastics. During the molding process, the thermoplastics are first heated to molten temperatures so that they can be molded to desired shapes. Once the molten thermoplastics are contoured to the desired shapes, they are cooled to the ambient temperature to solidify the thermoplastics to form the customized shapes.

Thus, heating and cooling means are required to practice the prior art hand grips. Typically, the molding process is carried out at a manufacturing plant, or a retailer store where a user normally purchases the article. It is not possible for individual users to make adjustment before each usage. Therefore, such hand grips are not practical for articles that require frequent contour customization by the user, or articles that are designed for multiple users.

It is therefore desirable to provide a hand grip that overcomes the above-mentioned deficiencies and can be easily adapted to conform to the user's hand.

SUMMARY OF THE INVENTION

The present invention relates to a gripping device for a hand held article. The gripping device comprises an encasement assembly for fitting on a hand grip portion of the article. The encasement assembly contains a controllable fluid, such as magnetorheological and electrorheological fluids. The gripping device further comprises an activating assembly for selectively applying an activating field to the controllable fluid to change its rheological behavior.

The encasement assembly of the gripping device can be a tubular member surrounding the hand grip portion of the article, or constitutes at least a portion of the hand grip of the article. The encasement assembly comprises wrapping member defining at least one cavity member for enveloping the controllable fluid. In a preferred embodiment, the wrapping member defines a plurality of cavity members in which the controllable fluid is encapsulated. The wrapping member can be made from urethane.

The activating assembly of the gripping device can have various forms. In one preferred embodiment where the controllable fluid employed is a magnetorheological fluid, the activating assembly is a permanent magnet member movably positioned relative to the tubular encasement assembly. Alternatively, the activating assembly can comprise an electro-magnetic member disposed proximate to the tubular encasement assembly, and a selectively actuatable power source for supplying power to the electro-magnetic member. The electro-magnetic member is preferably a coil member and the power source can include at least one battery and a switch.

In another preferred embodiment where the controllable fluid employed is an electrorheological fluid, the activating assembly comprises a pair of electrode members and a selectively actuatable power source for supplying power to the electrode members.

The present invention also relates to a manual implement, such as a writing pen, that employs the above described gripping device. The manual implement comprises a body portion with a hand grip portion thereon. The body portion comprises a hollow chamber extending at least partially into the hand grip. The encasement assembly of the gripping device fits on the hand grip portion of the body portion and the activating assembly is adapted to fit inside the hollow chamber. The activating assembly can be a permanent magnet mounted to be slidable into and out of the hollow chamber inside the hand grip portion. Alternatively, the activating assembly comprises an electro-magnetic member mounted inside the hollow chamber and at least partially surrounded by the encasement assembly, a power source for supplying power to the electro-magnetic member and a switch member.

In a further preferred embodiment of the present invention, the switch member is a shield member slideably mounted inside the hollow chamber and between an off position and an on position. In the off position, the shield is located between the encasement assembly and the electro-magnetic member.

The present invention further relates to a method for using a manual implement having a gripping device containing a controllable fluid changeable between a fluid state and a substantially rigid state. This method comprises the steps of: (a) holding the manual implement to imprint a personal grip on the gripping device, in which the controllable fluid is in a fluid state; (b) impressing an activating field on the controllable fluid to change its state to a substantially rigid state and to fix the personal grip; and (c) maintaining the controllable fluid in the substantially rigid state and the personal grip. This method of using the present invention may further comprise the step of (d) deactivating the field to resume the fluid state of the controllable fluid. The above steps (a) through (d) can be repeated as desired.

BRIEF DESCRIPTION OF THE DRAWINGS

These and other features, aspects, and advantages of the present invention will become more apparent from the following descriptions, appended claims, and accompanying drawings, where:

DETAILED DESCRIPTION OF THE PREFERRED EMBODIMENT

Figure 1:
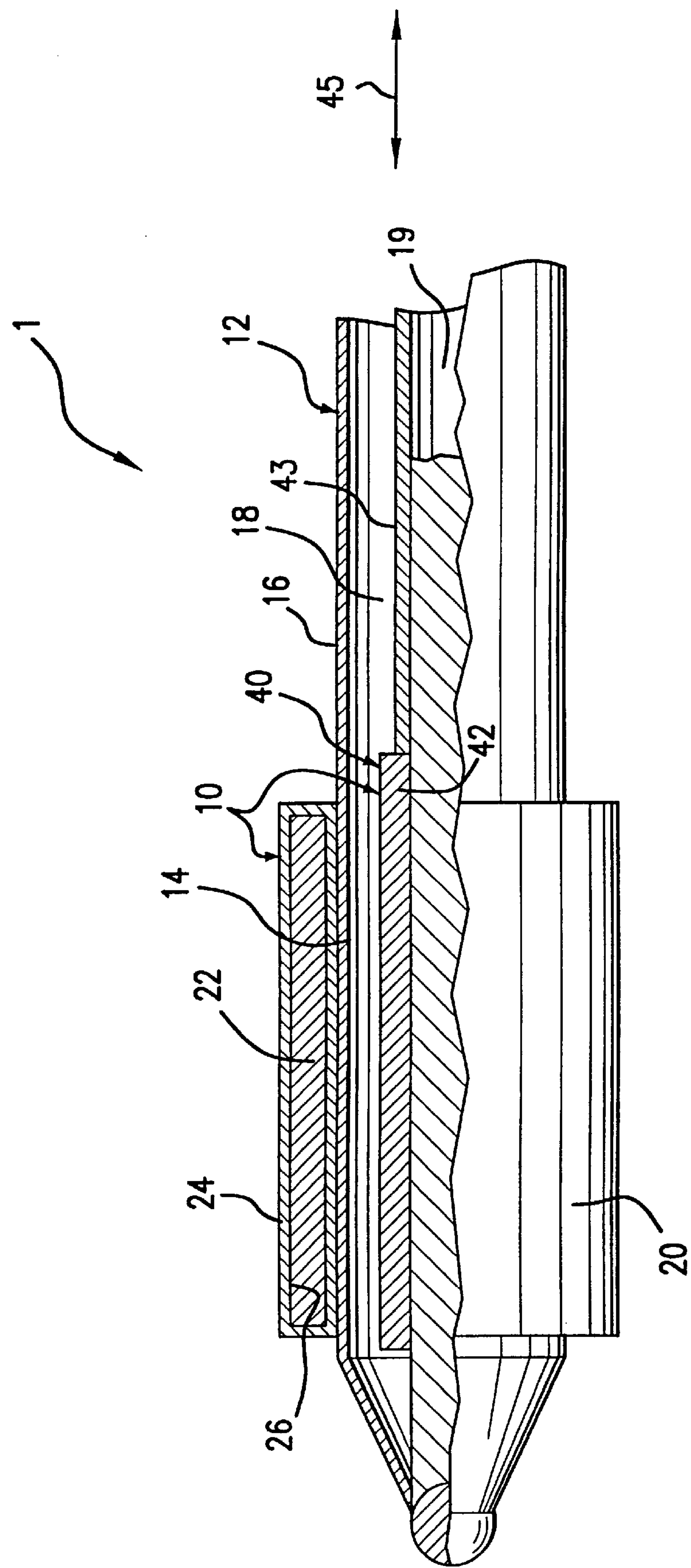
FIG. 1 is a partial longitudinal sectional view of a first embodiment of the gripping device according to the present invention used in connection with a writing pen.

Various gripping devices and manual implements embodying the principles of the present invention are illustrated in FIGS. 1–5. The gripping device of the present invention is capable of being easily and quickly altered from one desired contour to another desired contour to provide a comfortable hand grip for a user. In each embodiment, the same elements are designated with the same reference numerals and repetitive descriptions are omitted.

As depicted in the drawings, a manual implement 1 of the present invention comprises a gripping device 10 that partially fits on the implement body portion 12. More specifically, the implement body portion 12 has a generally elongated shape and has a hand grip portion 14. The gripping device 10 is partially mounted on hand grip portion 14. The implement body portion 12 has an outer wall 16, which defines a hollow chamber 18 for receiving various components, such as the activating assembly of gripping device 10 as discussed below. The hollow chamber 18 extends at least partially into the hand grip portion 14 of the implement body portion 12.

It is understood that the manual implement includes various hand held articles, such as writing pens, shavers, lighters, tools, sporting equipments including rackets and manipulating handles for various other equipments. All these hand held articles 12 may employ the gripping device 10 of the present invention with slight or no modification.

While the present invention has many applications, it is illustrated herein principally in connection with a writing pen 12, as depicted in the drawings. The writing pen 12 includes generally a barrel 16 corresponding to the outer wall 16 of the implement body portion, and an ink cartridge 19 disposed inside the hollow chamber 18.

The gripping device 10 of the present invention has an encasement assembly 20 and an activating assembly 40. The encasement assembly 20 is adapted to fit on hand grip portion 14 of writing pen 12, as shown in FIG. 1. The encasement assembly 20 contains a controllable fluid 22 therein. The activating assembly 40 is capable of selectively applying a field to the controllable fluid 22 to change its rheological behavior, such as dynamic yield strength and viscosity. When exposed to such a field, the viscosity of the controllable fluid increases to a point where it is substantially rigid, causing the controllable fluid 22 to "freeze". Thus, the shape of the encasement assembly 20 is maintained until the activating assembly 40 is withdrawn.

The controllable fluid 22 employed in the present invention is preferably a material that responds to an applied magnetic or electric field by changing in its rheological behavior, such as dynamic yield strength and viscosity. More specifically, the controllable fluid 22 can be a magnetorheological fluid, which is known to include suspensions of micron-sized, magnetizable particles in a fluid medium. Magnetorheological fluids in their fluid state have a relatively low viscosity and can flow freely in the absence of an applied magnetic field. However, upon the application of a magnetic field, the magnetorheological fluids respond with high magnitude dynamic yield strength and viscosity changes so that they thicken and develop a controllable yield stress. Accordingly, the flow of the controllable fluid within the encasement assembly 20 is substantially arrested due to the higher viscosity and dynamic yield strength.

The magnetorheological fluid for use in the present invention is obtainable from the Lord Corporation at 405 Gregson Drive, Cary, N.C. 27511. In particular, magnetorheological fluids that are water based are preferred, due to the ease of handling such fluids. Other magnetorheological fluids are also usable with the present invention.

The controllable fluid 22 used in the present invention can also be an electrorheological fluid. It is known that electrorheological fluids are dense suspensions of small, polarizable particles in viscous, insulating liquids. When electric fields are applied to these slurries, their apparent viscosities increase dramatically. Hence, the stiffness of the electrorheological fluids are controllable. Electrorheological fluids usable with the present invention can also be obtained from Lord Corporation.

The encasement assembly 20 of the gripping device 10 is adapted to fit on the writing pen 12 surrounding and covering a substantial part of its hand grip portion 14. The encasement assembly 20 can have various constructions as long as it can envelop the controllable fluid 22 therein. In the embodiments shown, it has generally a tubular shape with its inner surface dimensioned to tightly fit on the hand grip portion 14 so as to secure the encasement assembly 20 on the writing pen 12. The encasement assembly 20 can have a wrapping member 24 for sealing the controllable fluid 22. The wrapping member 24 defines a cavity member 26, such as a generally annular cavity member 26 shown in FIG. 1, In the embodiment shown in FIG. 2, the wrapping member 24 of the encasement assembly 20 defines a plurality of cavity members 26 encapsulating the controllable fluid 22. Preferably, the wrapping member 24 is made of a flexible material, such as urethane.

Figure 4:
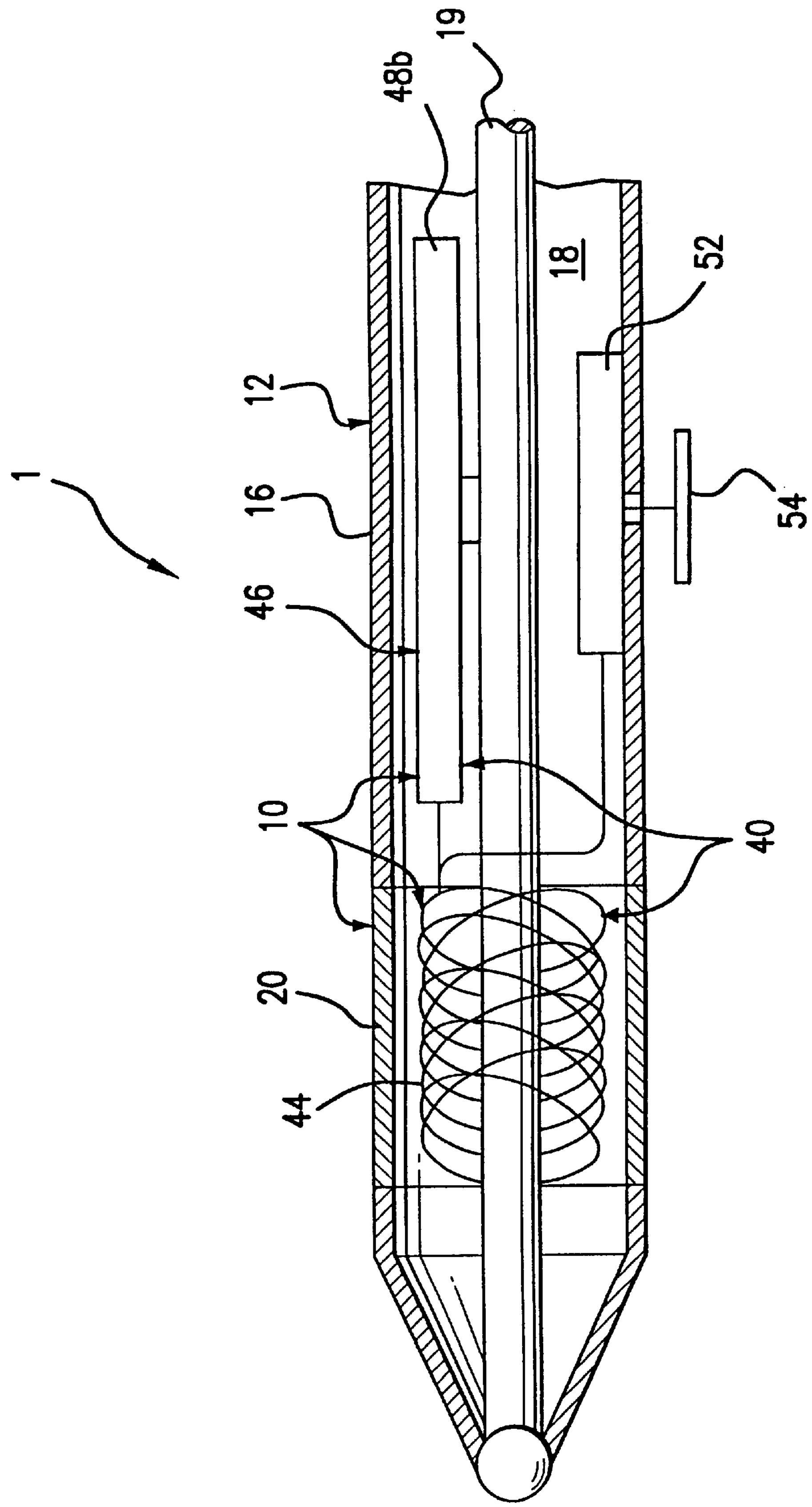
FIG. 4 is a longitudinal sectional view of a forth embodiment of the gripping device.

Alternatively, the encasement assembly 20 may constitute at least a part of the hand grip portion 14 of the writing pen 12. As shown in FIG. 4, the encasement assembly 20 replaces the hand grip portion 14 and becomes a part of the barrel 16 of the writing pen 12. In this case, the writing pen 12 exhibits a smooth outer surface. When so constructed, it is beneficial to provide the encasement assembly 20 with sufficient rigidity as required for a writing pen barrel. In a preferred embodiment, the wrapping member 24 of the encasement assembly 20 is primarily made from a rigid material with a flexible area exposed at its outer surface.

Figure 5:
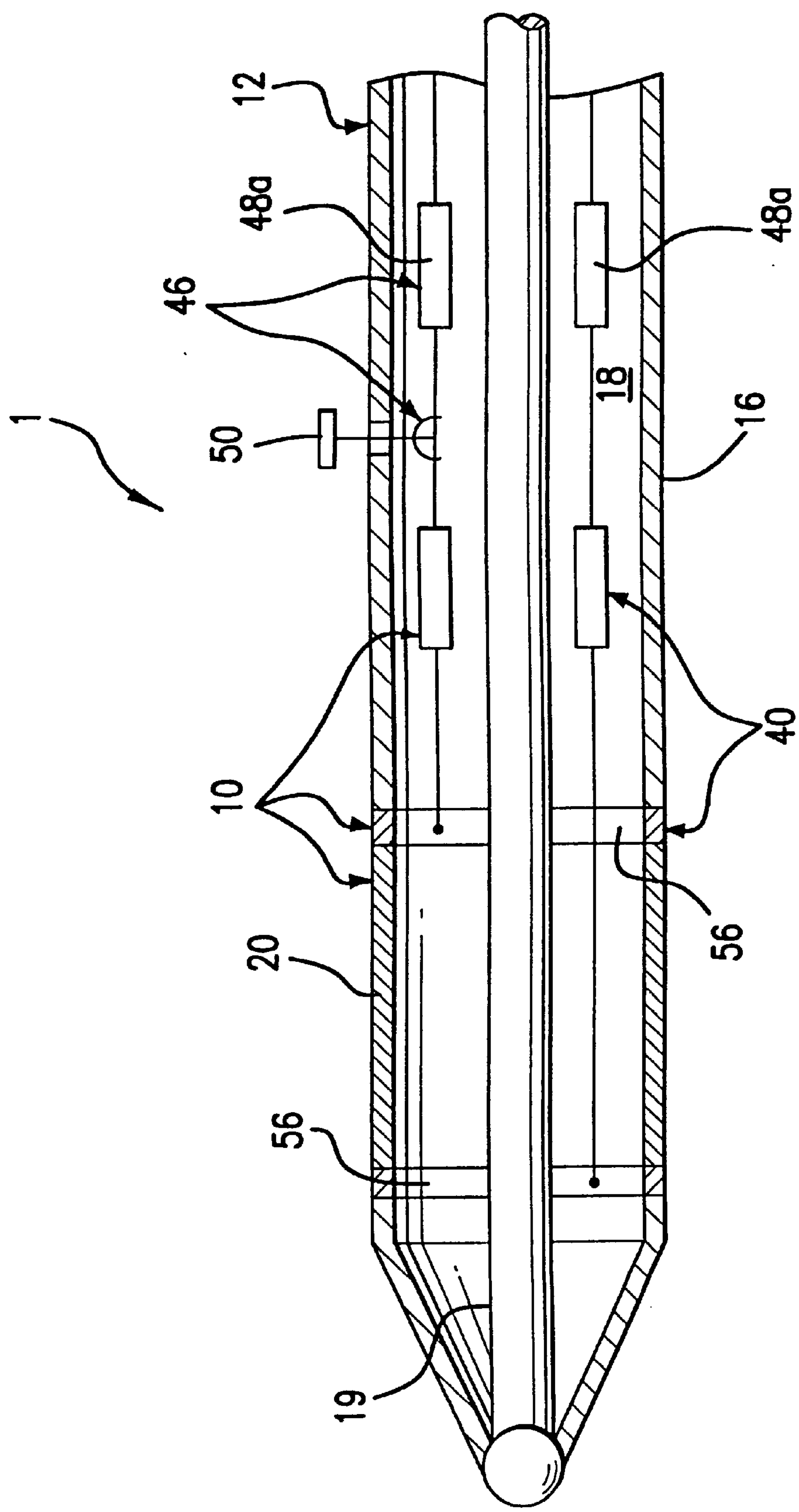
FIG. 5 is a longitudinal sectional view of a fifth embodiment of tie gripping device.

The activating assembly 40 of the gripping device 10 is capable of applying a field on the controllable fluid 22 encased in the encasement assembly 20. The applied field acts to increase the viscosity of the controllable fluid 22 so that the controllable fluid 22 changes from its original fluid state to a substantially rigid state. Thus, the controllable fluid 22 stiffens to maintain its shape for as long as the applied field acts on it. Depending on the type of the controllable fluid 22 employed, the activating assembly 40 can either generate a magnetic field applicable to a magnetorheological fluid, as shown in FIGS. 1–4, or an electric field applicable to an electrorheological fluid, as shown in FIG. 5. Further, the applied magnetic or electric field can be generated in different manners in accordance with the various embodiments of the activating assembly 40 described below.

The activating assembly 40 is preferably disposed in the hollow chamber 18 of the writing pen 12. As shown in FIG. 1, the activating assembly 40 is a permanent magnet member 42. The permanent magnet member 42 is a tubular member loosely telescoping the ink cartridge 19 of the writing pen 12 inside the hollow chamber 18. The permanent magnet member 42 is mounted to be movable relative to the tubular encasement assembly 20. The movement of the permanent magnet member 42 along arrow 45 can be accomplished with the aid of a sleeve member 43 that connects the magnet member 42 to an actuating member (not shown) located proximate the top end of the writing pen 12.

When the permanent magnet member 42 is moved to the position as shown in FIG. 1, it applies a magnetic field to the magnetorheological fluid 22 to "stiffen" the same into a substantially rigid state. On the other hand, when the permanent magnet member 42 is retracted from such position, the magnetic field is also removed. The magnetorheological fluid 22 then returns to its original fluid state.

Figure 2:
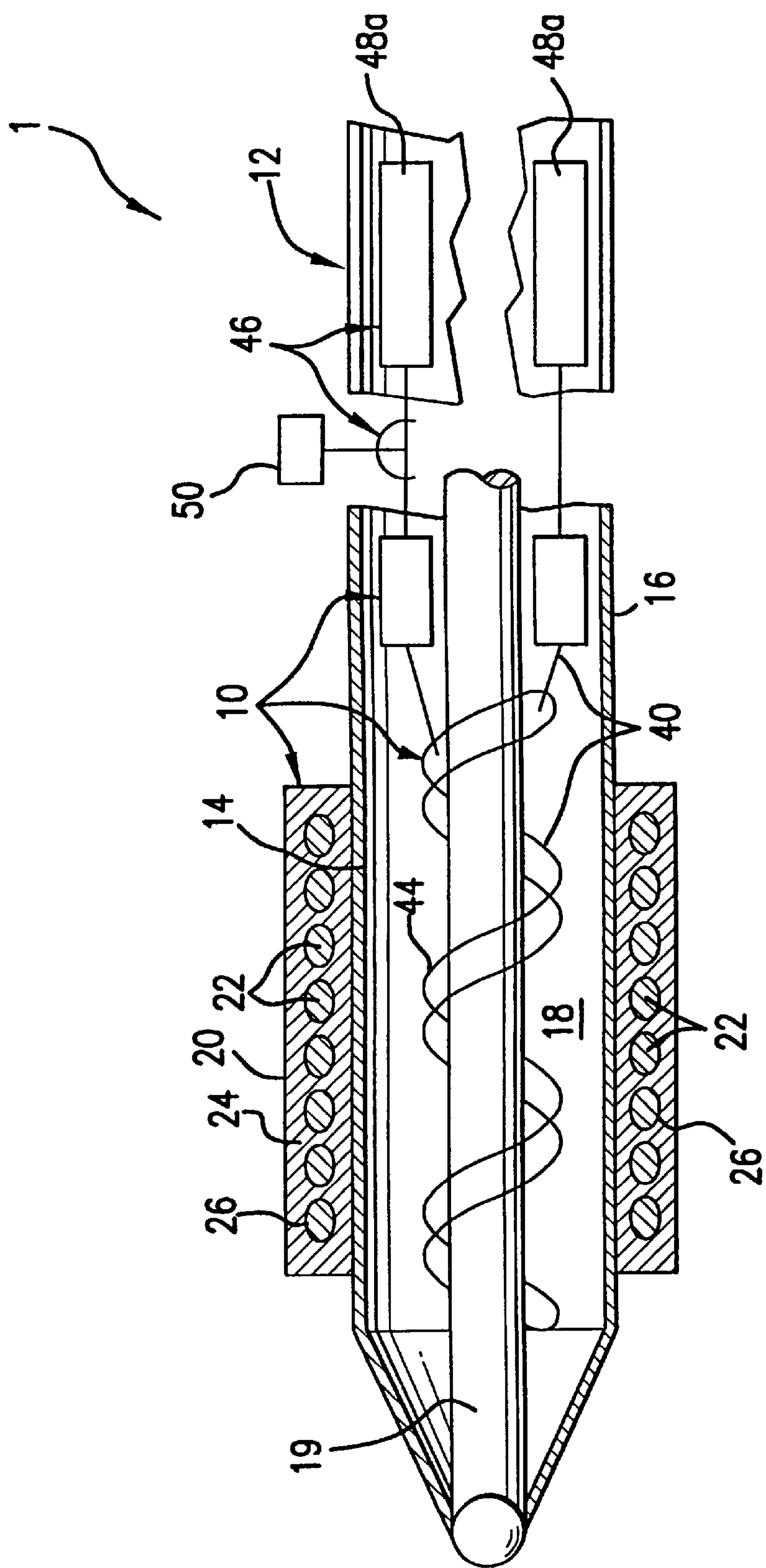
FIG. 2 is a longitudinal sectional view of a second embodiment of the gripping device.
Figure 3:
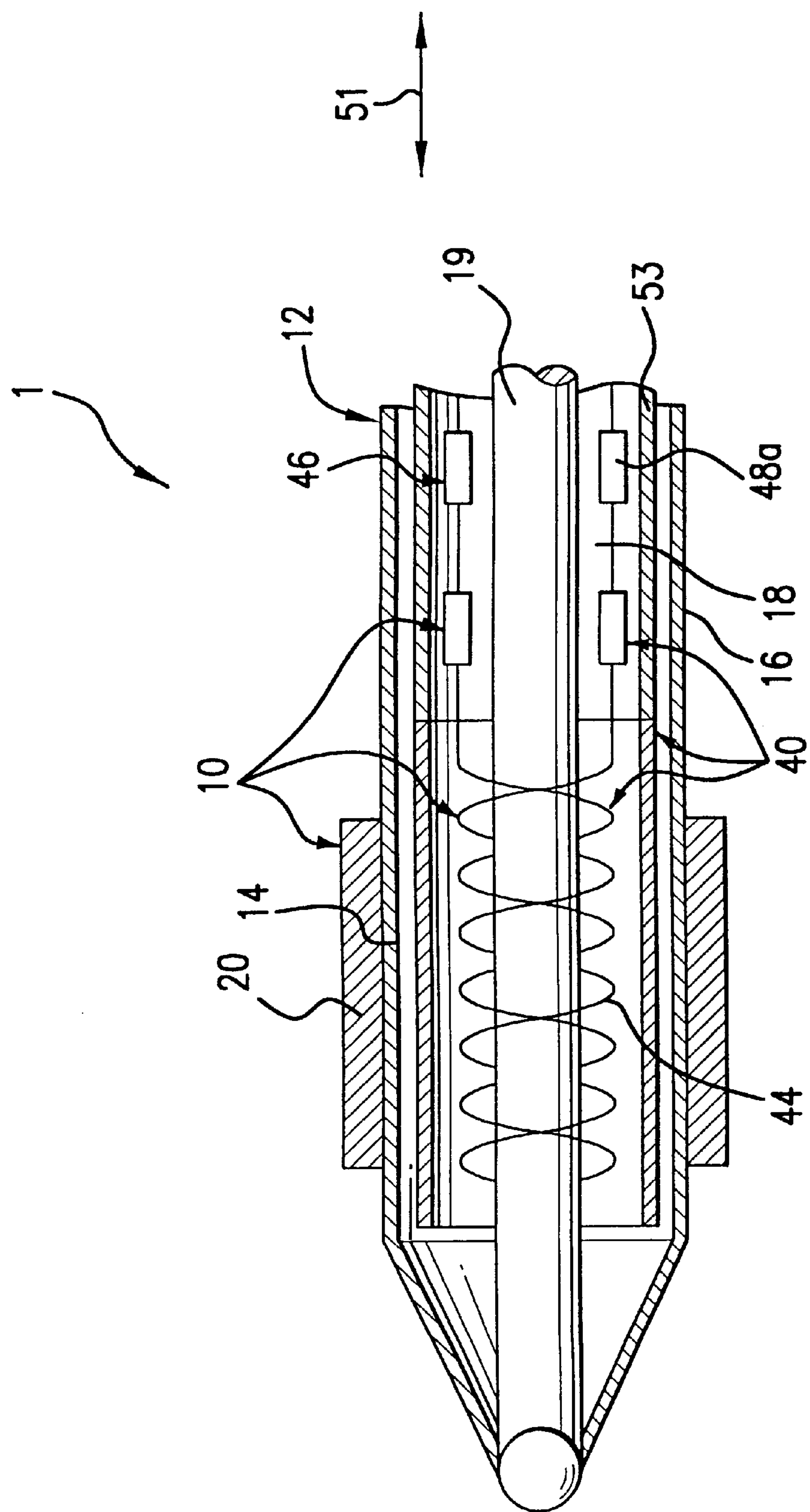
FIG. 3 is a longitudinal sectional view of a third embodiment of the gripping device.

FIGS. 2–4 depict another method for generating the magnetic field. The activating assembly 40 in these embodiments includes an electro-magnetic member 44, which is preferably a coil member. The electro-magnetic coil member 44 loosely surrounds the ink cartridge 19 of the writing pen 12 and is disposed proximate to the tubular encasement assembly 20. In contrast to the previously discussed permanent magnet member 42, the coil member 44 is preferably fixedly mounted in relation to the encasement assembly 20 by various conventional means within the knowledge of one ordinary skilled in the art.

In addition, the activating assembly 40 includes a selectively actuatable power source 46 provided for supplying power to the electro-magnetic coil 44. The power source 46 may comprise a battery unit 48 used in connection with a switch member 50 as depicted in FIG. 2. The battery unit 48 includes an array of batteries 48*a* as shown in FIGS. 2 and 3 or a battery pack member 48*b* as shown in FIG. 4. Alternatively, a plurality of solar cells can be used in place of the battery unit 48.

In a preferred embodiment as shown in FIG. 2, the switch member 50 is an on/off switch that is mounted on the outside of the barrel 16 of the writing pen 12. The power source 46, including the battery unit 48 and the on/off switch 50, is electrically connected to the electro-magnetic coil member 44 to form a closed circuit 44,46. The user may actuate the on/off switch 50 to connect the circuit 44,46 and thereby generating a magnetic field applicable to the magnetorheological fluid 22. Alternatively, the on/off switch 50 can be actuated to disconnect the circuit 44,46 to remove the magnetic field.

In another embodiment as shown in FIG. 3. the switch member 50 is a shield member. The shield member 53 has a sleeve-like shape and is slideably mounted inside the hollow chamber 18 of the writing pen 12. The shield member 53 is movable between an off position and an on position. In the off position, the shield member is located between the encasement assembly and the electro-magnetic member, as shown in FIG. 3, where the shield member 53 blocks the applied field from acting on the controllable fluid 22. When the shield member 53 is moved in the direction of arrow 51 from the off position to an on position, the magnetic or electric field generated by the activating assembly 40 is applied to the controllable fluid 22 to stiffen the same as discussed above.

In the preferred embodiment shown in FIG. 4, a rheometer 52 is further provided to vary the stiffness of the magnetorheological fluid 22. The rheometer 52 is also electrically connected to the circuit 44,46 and includes a dial member 54 located outside the barrel 16 of the writing pen 12. Thus, the user may adjust the dial member 54 to change the electric current flowing into the electro-magnetic coil member 44 to alter the viscosity of the magnetorheological fluid 22. The rheometer 52 can also reduce the electric current to zero to disconnect the circuit 44,46. In this manner, the rheometer 52 acts similar to an on/off switch 50 as discussed above.

FIG. 5 illustrates an activating assembly 40 designed to generate an electric field applicable to the electrorheological fluid 22 sealed in the encasement assembly 20. The activating assembly 40 comprises a pair of electrode members 56 disposed at the ends of the encasement assembly 20. In a preferred embodiment, the electrode members 56 are a pair of disk electrodes. In addition, a selectively actuatable power source 46, similar to that as described above, is provided to supply power to the electrode members 56. When the user actuates the switch member 50 or rheometer 52, the power source 46 generates an electric field between the electrode members 56. The electric field is then applied to the electrorheological fluid 22 to stiffen same. Alternatively, the switch member 50 or rheometer 52 can be actuated to disconnect the power source 46 and thus remove the electric field from the electrorheological fluid 22.

When using manual implement 1 such as the writing pen 12 depicted herein, the user first holds the gripping device 10 of the writing pen 12 as if holding a conventional pen. The user's fingers imprint a unique grip on the gripping device 10, with the controllable fluid 22 in a fluid state.

The user can then impress a field on the controllable fluid 22 to change its state to a substantially rigid state and thereby freezes the unique grip. As discussed above, the applied field can be generated by sliding a permanent magnet member 42 to align with the encasement assembly 20 as shown in FIG. 1, actuating an on/off switch 50 to connect the circuit 44,46 as shown in FIG. 2 or moving a shield member 53 to its off position. The applied field changes the controllable fluid 22 from its initial liquid state to a substantially rigid state to retain the unique grip. A customized personal grip is thus formed that can provide the user with a more comfortable grip and better control of the writing pen 12.

Such a customized personal grip can be maintained for as long as the applied field acts on the controllable fluid 22. The user can have a comfortable grip for an extended time period. When the user finishes with the customized grip, it can be easily removed by deactivating the applied field, as described above. Once the applied field is deactivated, the controllable fluid 22 resumes its original fluid state and becomes flexible for new imprints. If another customized grip is desired by the same user or by a different user, the user simply repeats the above described steps.

The foregoing description is only illustrative of the principle of the present invention. It is to be recognized and understood that the invention is not to be limited to the exact configuration as illustrated and described herein. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A gripping device for a hand held article comprising:

an encasement assembly for fitting on a hand grip portion of the article, the encasement assembly containing a controllable fluid; and an activating assembly for selectively applying a field to the controllable fluid to change its rheological behavior.

2. The gripping device of claim 1 wherein the controllable fluid is a magnetorheological fluid.

3. The gripping device of claim 1 wherein the controllable fluid is an electrorheological fluid.

4. The gripping device of claim 3 wherein the activating assembly comprises a pair of electrode members that sandwich the encasement assembly in between and a selectively actuatable power source for supplying power to the electrode members.

5. The gripping device of claim 1 wherein the encasement assembly is tubular surrounding the hand grip portion of the article.

6. The gripping device of claim 5 wherein the activating assembly comprises a permanent magnet member movable relative to the tubular encasement assembly.

7. The gripping device of claim 5 wherein the activating assembly comprises an electro-magnetic member disposed proximate to the tubular encasement assembly and a selectively actuatable power source for supplying power to the electro-magnetic member.

8. The gripping device of claim 7 wherein the electro-magnetic member is a coil member and the power source comprises at least one battery.

9. The gripping device of claim 5 wherein the activating assembly comprises a pair of disk shaped electrode members that sandwich the encasement assembly in between and a selectively actuatable power source for supplying power to the electrode members.

10. The gripping device of claim 1 wherein the encasement assembly comprises a wrapping member enveloping the controllable fluid.

11. The gripping device of claim 10 wherein the wrapping member defines a plurality of cavity members in which the controllable fluid is encapsulated.

12. The gripping device of claim 11 wherein the wrapping member is made of urethane.

13. The gripping device of claim 1 wherein the encasement assembly constitutes at least part of the hand grip portion of the article.

14. The gripping device of claim 1 further comprising, in combination, a hand grip member.

15. A manual implement having a gripping device fit thereon comprising:

a body portion having a hand grip portion;

an encasement assembly disposed on the hand grip portion and containing a controllable fluid; and an activating assembly for selectively applying a field to the controllable fluid to change its rheological behavior.

16. The manual implement of claim 15 wherein the body portion comprises a hollow chamber extending at least partially into the hand grip portion.

17. The manual implement of claim 16 wherein the activating assembly comprises a permanent magnet mounted to be slidable into the hollow chamber inside the hand grip portion.

18. The manual implement of claim 16 wherein the activating assembly comprises an electro-magnetic member mounted inside the hollow chamber and surrounded by the encasement assembly, a power source for supplying power to the electro-magnetic member and a switch member.

19. The manual implement of claim 18 wherein the switch member is a shield member slideably mounted inside the hollow chamber and between an off position and an on position, wherein the off position is located between the encasement assembly and the electro-magnetic member.

20. A method for using a manual implement having a gripping device containing a controllable fluid changeable between fluid and substantially rigid states comprising the steps of:

(a) holding the manual implement to imprint a personal grip on the gripping device, in which the controllable fluid is in a fluid state;

(b) impressing a field on the controllable fluid to change its state to a substantially rigid state and to fix the personal grip; and (c) maintaining the controllable fluid in the substantially rigid state and the personal grip.

21. The method of claim 20 further comprising the step of:

(d) deactivating the field to resume the fluid state of the controllable fluid.

22. The method of claim 21 further comprising the step of repeating the steps (a) through (d).

* * * * *